United States Patent [19]
Ryan et al.

[11] Patent Number: 5,966,282
[45] Date of Patent: Oct. 12, 1999

[54] POWER SURGE PROTECTION ASSEMBLY

[75] Inventors: Barry D. Ryan, Coeur d'Alene; Norm Janshen, Hayden, both of Id.; Brad Herr, Spokane, Wash.; Mark Scuitti; Jim Wilson, both of Post Falls, Id.; Alexander C. Johnson, Jr., Portland, Oreg.

[73] Assignee: A. C. Data Systems, Inc., Coeur d-Alene, Id.

[21] Appl. No.: 08/996,042

[22] Filed: Dec. 22, 1997

Related U.S. Application Data

[63] Continuation-in-part of application No. 08/922,718, Sep. 3, 1997, which is a continuation-in-part of application No. 08/672,418, Jun. 28, 1996, Pat. No. 5,701,227, which is a division of application No. 08/360,982, Dec. 20, 1994, Pat. No. 5,602,532.

[51] Int. Cl.$^6$ ....................................................... H01C 7/12
[52] U.S. Cl. ............................................ 361/118; 361/656
[58] Field of Search .................................. 361/56, 91, 111, 361/118, 627, 629, 633, 636–637, 639–640, 648, 650, 653, 655–656

[56] References Cited

U.S. PATENT DOCUMENTS

| | | |
|---|---|---|
| D. 371,113 | 6/1996 | Hubbell et al. . |
| 2,749,484 | 6/1956 | Levitt . |
| 2,752,537 | 6/1956 | Wolfe . |
| 3,177,405 | 4/1965 | Gray . |
| 3,193,611 | 7/1965 | Huetten et al. . |
| 3,478,251 | 11/1969 | Perotto et al. . |
| 3,670,205 | 6/1972 | Dixon et al. . |
| 3,725,744 | 4/1973 | Reed . |
| 3,992,225 | 11/1976 | Sykes . |
| 4,161,012 | 7/1979 | Cunningham . |
| 4,642,733 | 2/1987 | Schacht ................................ 361/656 |
| 4,797,773 | 1/1989 | Honorof et al. . |
| 5,023,745 | 6/1991 | Glass ........................................ 361/56 |
| 5,130,894 | 7/1992 | Miller . |
| 5,311,393 | 5/1994 | Bird . |
| 5,394,303 | 2/1995 | Yamaji . |
| 5,500,782 | 3/1996 | Oertel et al. . |
| 5,508,873 | 4/1996 | Knapp et al. . |
| 5,568,356 | 10/1996 | Schwartz . |
| 5,602,532 | 2/1997 | Ryan . |
| 5,627,720 | 5/1997 | Lewis ..................................... 361/118 |
| 5,757,603 | 5/1998 | Kapp et al. ............................. 361/118 |

OTHER PUBLICATIONS

Franklin D. Honorof, *Transient Problems and Their Solutions*, Jan. 1977, pp. 22–23.

Transtector Systems, *Broadcast Engineering: "Lightning and Surge Protection Application"*, Feb. 10, 1979, Note 2010.

H. Niles Gloer, *Voltage Transients and the Semiconductor*, Mar./Apr. 1979, pp. 37–40.

(List continued on next page.)

*Primary Examiner*—Michael J. Sherry
*Attorney, Agent, or Firm*—Marger Johnson & McCollom, P.C.

[57] ABSTRACT

A power surge protection assembly for use in electrical panel boxes having multiple electrical components. The power surge protection assembly includes a bus bar connected to a power supply, typically ground. The power surge protection assembly additionally includes a suppression box having a top surface, a bottom surface, sides, and ends for encasing a power surge suppression circuit. A conductor extends outward from an end of the suppression box. A coupler is attached to the bus bar for receiving the conductor and mechanically coupling the suppression box to the bus bar and electrically coupling the suppression box to the power supply. A variety of conductors and couplers are disclosed including post, bar, and plug conductors and snap ring, clip, jack, and bore couplers. The power surge protection assembly is particularly adapted for stacking two or more surge suppression boxes.

20 Claims, 16 Drawing Sheets

OTHER PUBLICATIONS

Transtector Systems, *Protection for Solid–State Uninterruptible Power Supplies (UPS)*, Nov. 5, 1979, Note 9111.

Transtector Systems, *Digital Electronic Weighing Systems—Techniques for Transient Voltage Protection, Grounding and System Insulation*, Nov. 5, 1979, Note 9114.

Transtector Systems, *Transient Protection for Weekly Generator Testing*, Feb. 5, 1980, Note 9113.

Transtector Systems, *Transient Protection for Systems Utilizing a Motor–Generator*, Mar. 17, 1980, Note 9116.

Transtector Systems, *Electronic Weighing Systems*, Apr. 18, 1980, Note 9115.

Transtector Systems, *Understanding Powerline Monitor Printouts*, Jan. 20, 1982, Note 9117.

Richard Odenberg, *Too Many Volts Can Be A Jolt To The System*, Apr. 12, 1982, pp. 45–47.

Transtector Systems, *Computerized Energy Management Systems*, Apr. 30, 1982, Note 9118.

Richard Odenberg and Thomas Golway, *Transient Overvoltage Protection*, Oct. 1982, Bulletin 1705–134.

Transtector Systems, *Why Voltage Regulating/Isolating Transformers and Power Conditioners Do No Suppress High–Speed, High–Energy Transients*, Mar. 15, 1983, Note 9110A.

Katie McAdams, *Power Protection Prescription*, Oct. 1983, vol. 7, No. 10.

Transtector Systems, *Misconception Regarding "Dedicated Lines" for Computers*, Mar. 1, 1984, Note 9112A.

Richard Barclay and Joseph O'Keefe, *Downtime: What is the Real Cost?*, Jun. 1984.

Roger H. Edelson, *New Salvation from Surges*, Jun. 1984, TSA–130–032.

Bruce Braskich, *Transient Overvoltage—Sources, Consequences And Considerations*, Mar./Apr. 1985, TSA–130–030.

R. Odenberg and B.J. Braskich, *Line Transient Analysis*, Jun. 1985, TSA–130–039.

Larry C. Carmody, *United of Pennsylvania Beats Overvoltage Problem*, Jun. 2, 1986.

Tom Miller, *Take Charge of System Power Protection*, Jul. 1986, TSA–130–045.

Richard Odenberg, *What's In a Surge Suppressor?*, Mar. 1988, vol. 3 No. 3.

Government Computer News, *Surge Suppressor Protects Lab Against Voltage Spikes*, Apr. 29, 1988, vol. 7, No. 9.

Richard Odenberg, *Current and Developing Standards on Transient Overvoltage Surge Suppressors*, Jun. 1989, vol. 20, No. 3.

Kim Crompton, *Utility Blamed for Damage*, 101$^{st}$ Year, No. 2, TSA–130–028, The Spokesman–Review.

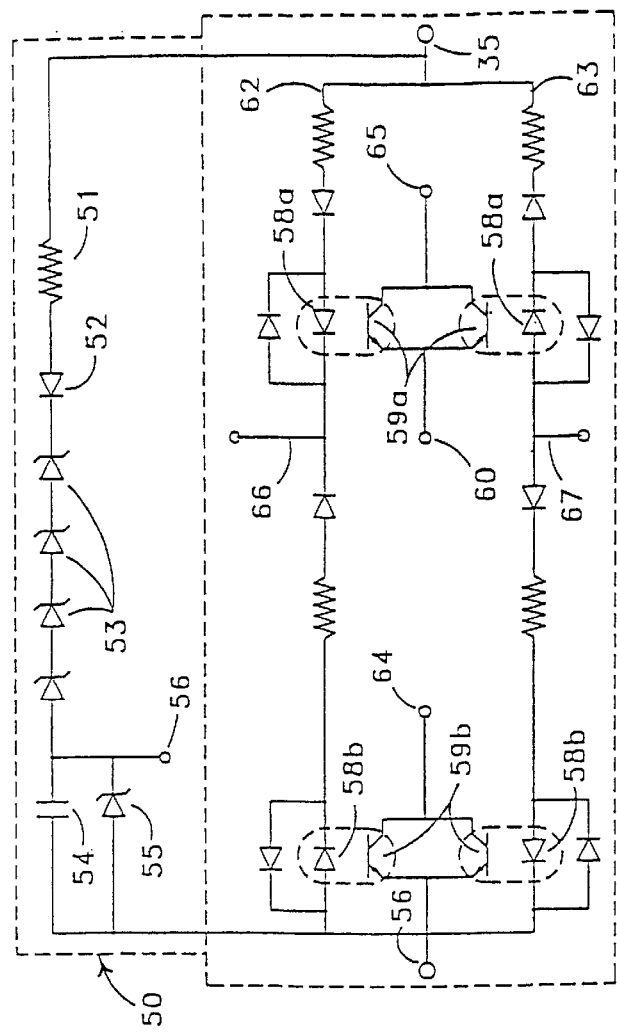
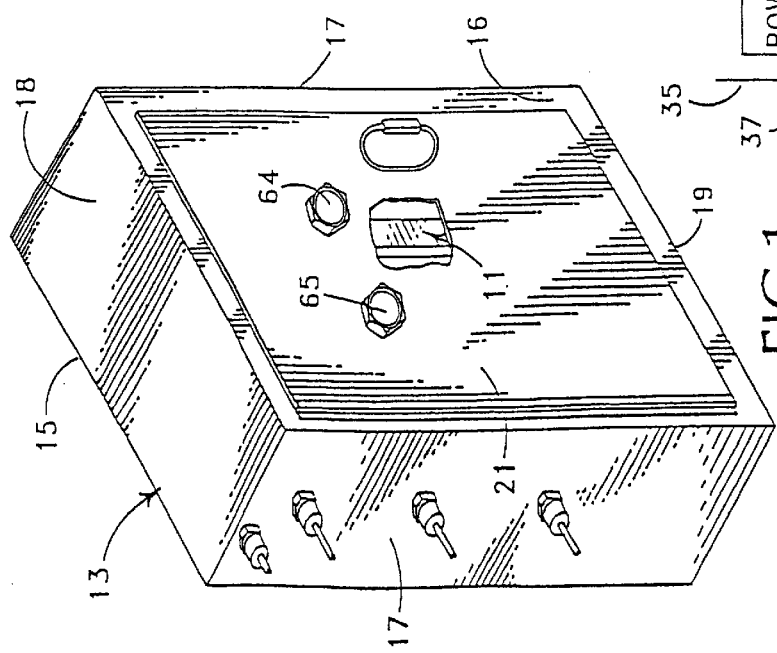
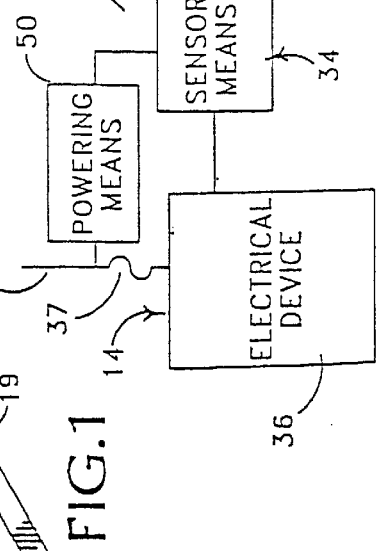
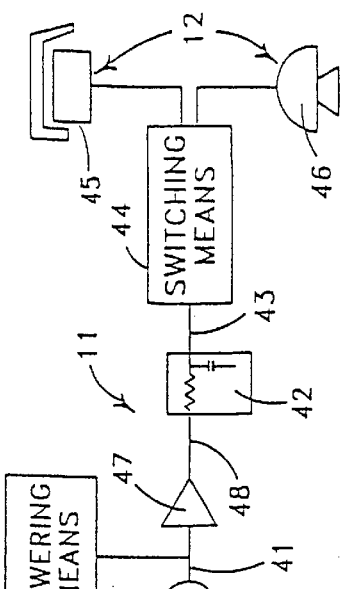
FIG. 1
FIG. 3
FIG. 4

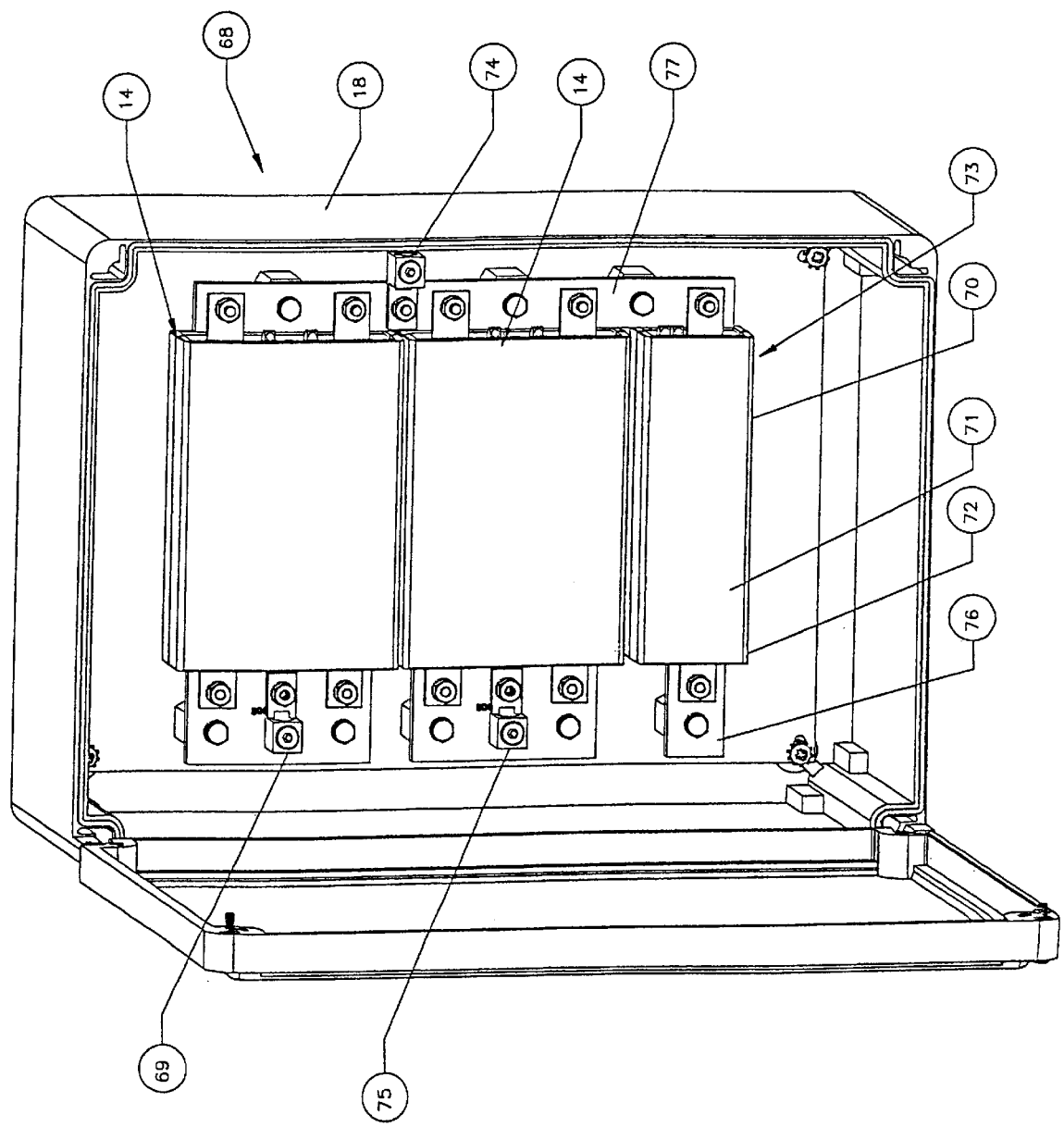

POWER SURGE PROTECTION ASSEMBLY

This is a continuation-in-part patent application of pending prior application Ser. No. 08/922,718 filed Sep. 3, 1997 of Barry D. Ryan entitled POWER SURGE PROTECTION ASSEMBLY which is a continuation-in-part of prior application Ser. No. 08/672,418 filed Jun. 28, 1996 now U.S. Pat. No. 5,701,227 of Barry D. Ryan entitled POWER SURGE PROTECTION ASSEMBLY which is a divisional of Ser. No. 08/360,982 filed on Dec. 20, 1994 now U.S. Pat. No. 5,602,532 issued Feb. 11, 1997.

FIELD OF INVENTION

This invention relates generally to an assembly for coupling surge suppression devices together in electrical boxes.

BACKGROUND AND DESCRIPTION OF PRIOR ART

In the recent past, it has become popular to use a modular design of components in electrical panel boxes. Such modular design is conducive to post and bus bar type support and electrical interconnection of components to provide a safer, lower cost and more reliable electrical panel that allows ready replacement, changes, removal and addition of components. This type of design does away with or substantially reduces the use of flexible wiring, and the design gains much of its advantage by reason of this. The post and bus bar type interconnection of components in panel boxes, however, generally relates only to primary circuitry for the electrical components, but yet various secondary sensory and annunciating circuitry is common or necessary in such boxes for practical utility to determine and make known their operational states and happenings.

The post and bus bar type architecture is more useful and practical in electrical networks having fewer electrical communications and especially in such networks where several of the electrical communications are of a common nature. Such architecture is not well adapted to electrical networks having a larger numbers of individual electrical interconnections that are not of a common nature such as normally exist in sensing and annunciating circuits. Responsively in the past, sensing and annunciating systems commonly have been wired with flexible insulated wiring, even in electrical systems using post and bus bar-type architecture for primary circuitry.

The instant invention deals with this problem by providing sensing circuits associated with various individual components of an electrical panel box that communicate with one or more annunciating circuits at a distance therefrom by audio linkage that does not require wiring or other linking hardware between the two circuits. Such a system allows the use of the post and bus bar architecture for primary electrical circuits and does away with the necessity of flexible wiring for sensing and annunciating circuitry carried in panel boxes, but yet allows dealing with sensing and annunciating functions in substantially the same fashion as if flexible wiring were used.

Sound has been used to transmit various information at least as long as speech has existed and its use to couple various electrical systems, or various parts of a single electrical system, also has heretofore become known. Sound waves and especially the so called "ultrasonic waves," having frequencies above the limits of human healing or in excess of about twenty kilocycles per second, have been used in connection with electronic circuitry in various types of alarm devices, door opening and unlocking devices, switching devices, and other similar devices. It is not known, however, that sonic coupling has been used to eliminate wiring in electrical panel boxes, especially in sensing and annunciating circuitry.

The instant invention is particularly applicable to electric panel boxes having plural modular elements interconnected in spaced stacked arrays by bus bar and post-type architecture. The bus bar and post architecture provides stable supporting and electrical interconnection of elements, but uses posts and bars that normally do not have surface insulation. Because of this, the use of flexible insulated wiring in such boxes not only is physically difficult by reason of the presence of bus bars and posts, but also is more dangerous because of the hazard of the secondary wiring's insulation becoming corrupted by means of normally present mechanical, thermal, and electrical forces that may cause shorting to the bus bars and posts. These hazards become enhanced in surge protectors with spaced stacked arrays of modular elements because of the generally hostile electrical environments in which these elements often exist and the sensitive nature of the electronic components that they contain and protect. The instant invention is particularly designed for use in such applications, especially at remote locations where access may be difficult. My invention resides not in any one of these particular features, but rather in the synergistic combination of all of its structures that gives rise to the functions necessarily flowing therefrom as specified and claimed.

SUMMARY OF INVENTION

My annunciating system provides a sensing circuit that presents an electrical current to activate a first transmitting acoustical transducer responsive to an electrical event to be annunciated. A receiving circuit provides a second receiving acoustical transducer at a spaced distance from the first transmitting transducer to receive the transmitted acoustical signal and responsively generate a current that is passed through a tuned amplifier to purify and enhance it about a particular frequency. The amplifier output is passed through a time delay integrator to selectively classify signals according to predetermined conditions to prevent noise or accidental transients from activating annunciation. Upon fulfillment of the predetermined conditions of the integrator, the signal is passed to a switching device which passes current to operate an annunciator and communication interface device if desired. The sound transmitted between the first and second transducers preferably is in the four kilocycle per second range.

The transducers that couple the sensing and annunciating circuits must acoustically communicate and preferably are carried within an electrical panel box of the type defining a normally closed chamber for electrical components, and especially an electrical panel box that houses stackable modular components that are primarily interconnected by bus bar and post architecture.

In providing such an annunciating system, it is:

A principal object to create an electrically powered, acoustically coupled system for use in an electrical panel box that provides a first acoustical transducer in a sensing circuit that transmits an acoustical signal to a second acoustical transducer, at a spaced distance from the first transducer, that responsively activates annunciating circuitry without any hard wiring between the transducers.

A further object is to provide such a system that has an annunciating circuit that includes a tuned amplifier to enhance and purify the transduced acoustic signal and a time delay integrator that classifies signals and passes current to institute annunciation only when predetermined conditions are met, to avoid accidental annunciation caused by noise or transients.

A yet further object is to provide such a system that is adapted for use in electrical panel boxes containing spaced arrays of stacked modular electrical components that are primarily interconnected by post and bus bar type architecture so that the annunciating system requires no flexible wiring in the panel box to transmit information between its sensing circuitry and its spacedly distant annunciating circuitry.

The stackable surge suppression boxes are provided in different sizes according to the amount and type of required surge suppression protection. The different sized suppression boxes are interchangeable within the same electrical panel and are stackable side-by-side or on top of each other. The different sized surge suppression boxes allow more customized surge suppression protection within the limited space of a standardized electrical panel.

The components inside the surge suppression box are arranged to increase the amount of surge suppression protection that can be provided within a given amount of space. A first conductor bus extends from the first side of the suppression box and a second conductor bus extends from a second side of the suppression box. A first substantially flat elongated bus bar extends from the first conductor along substantially an entire length inside the suppression box. A second substantially flat elongated bus bar extends from the second conductor along substantially the entire length of the suppression box and overlaps the first bus bar.

Multiple metal oxide varistors (MOVs) are coupled at a first end to the first bus bar and coupled at a second end to the second bus bar. The MOVs are coupled in parallel between the first and second bus bar along the entire length of the surge suppression box. The overlapping first and second bus bars allow more MOVs to be used inside a smaller surge suppression box. Because a smaller surge suppression box can be used, modular surge suppression units can be assembled in a greater variety of arrangements inside the electrical panel for more customized power surge protection.

A still further object is provide such a system that uses acoustical transducers of small size so that they may be readily contained in or supported upon primary modular components without disrupting the function, purpose or architecture of those primary modular components.

A still further object is to provide such a system that is of new and novel design, of rugged and durable nature, of simple and economic manufacture and otherwise well suited to the uses and purposes for which it is intended.

Other and further objects of my invention will appear from the following specification and accompanying drawings which form a part hereof. In carrying out the objects of my invention, however, it is to be remembered that its accidental features are susceptible of change in design and structural arrangement with only one preferred and practical embodiment of the best known mode being illustrated in the accompanying drawings, as is required.

BRIEF DESCRIPTION OF THE DRAWINGS

In the accompanying drawings which form a part hereof, and wherein like numbers of reference refer to similar parts throughout:

FIG. 1 is a partially cut-away isometric surface view of an electrical panel box within which my annunciating system is designed to operate.

FIG. 3 is a flow-type electrical diagram in normal symbology of the overall circuitry of my annunciator.

FIG. 4 is an electrical diagram in normal symbology of the detailed circuitry of the preferred activating circuit.

FIG. 5 is a perspective view of two different sized surge suppression boxes attached side-by-side inside an electrical panel.

DESCRIPTION OF THE PREFERRED EMBODIMENT

Figure 2:
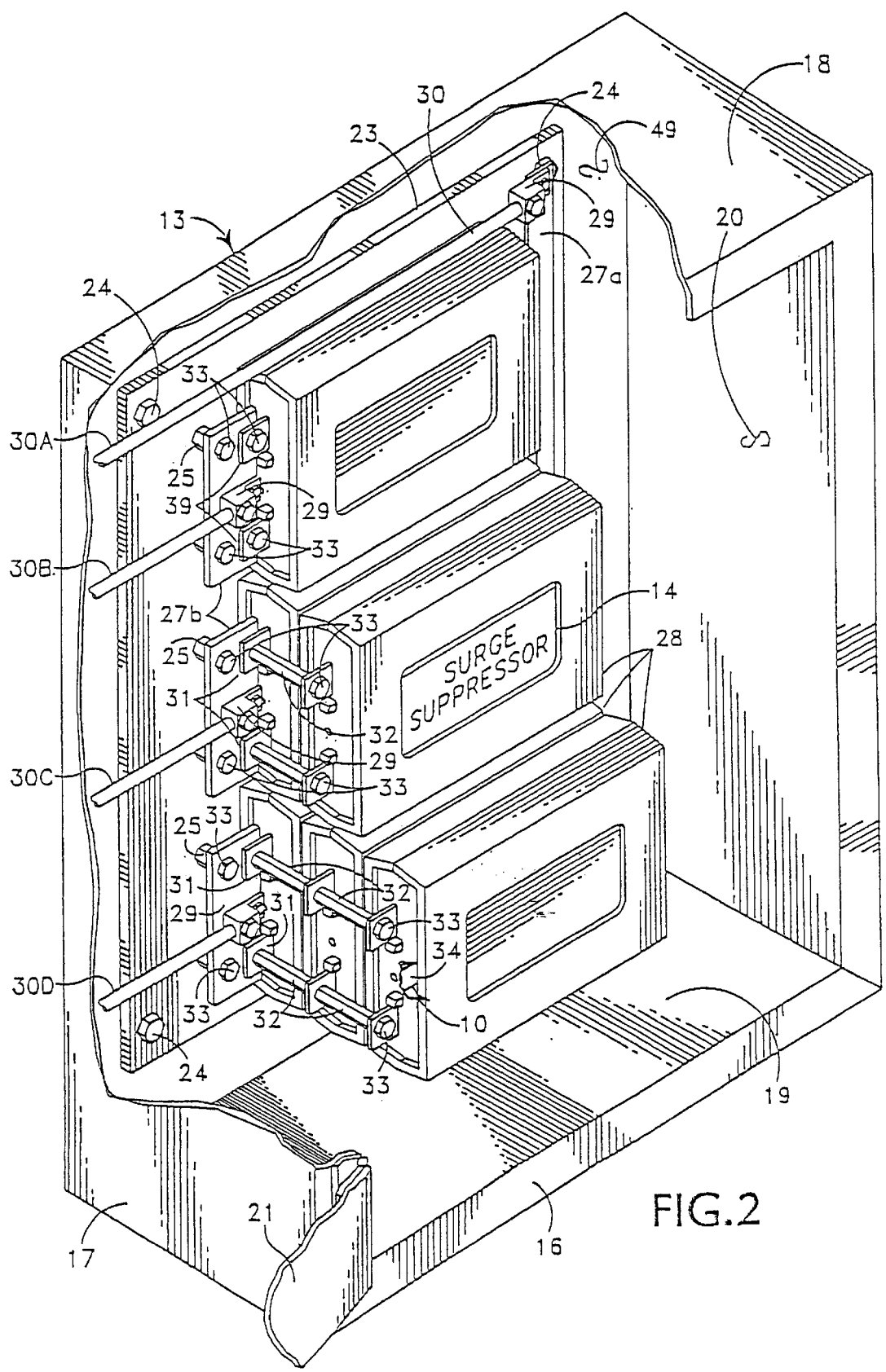
FIG. 2 is a somewhat enlarged, partially cut-away isometric view of the electrical panel box of FIG. 1, with the cover open to show the box contents.

My annunciating system generally provides activating circuit 10 having a first transmitting acoustical transducer at a spaced distance from a second receiving acoustical transducer carried in annunciating circuit 11, which responsive to sonic signals from the first transducer activates annunciating devices 12. The annunciating circuitry 11 is carried in panel box 13 which encases surge suppressing blocks 28 that carry activating circuits 10 within their casements.

Panel box 13 is a rigid, peripherally defined, generally rectilinear box formed by structurally joined back panel 15, front panel 16, similar side panels 17, top panel 18 and similar bottom panel 19. The front panel 16 defines orifice 20 that is selectively covered by door 21 to enclose chamber 49. The panel box elements define various orifices as required for the passable of connectors and indicators from chamber 49 externally of the box. This essential structure is well known and common in many electrical panel boxes in present day use.

As seen particularly in FIG. 2, chamber 49 of the panel box houses mounting plate 23 structurally carried on the inner surface back 15 by plural nut and bolt combinations 24. Mounting plate 23 supports a plurality of variously arrayed electrically insulative mounting posts 25, which in turn support various bus bars 27. Bolts 33 communicate between mounting plate 23 and mounting posts 25 and between mounting posts 25 and bus bars 27 to positionally maintain these elements in various arrays relative to each other and to maintain the electrical independence of the bus bars from the mounting plate.

In the instance illustrated in FIG. 2, the single elongated neutral bus bar 27a is arrayed spacedly distant from three spaced bus bars 27b to mount single or stacked arrays of surge suppressing blocks 28. Each bus bar 27 carries a connector 29 to interconnect a neutral from conductor 30A and three phase power from electrical conductors 30B, 30C and 30D that extends exteriorly of the panel box through an orifice therein.

Each of the surge suppression blocks 28 contains a surge suppressor 14 alternatively referred to as an electrical device and provides block conductor buses 31 extending from each end to interconnect with opposed bus bars 27a and 27b respectively. A plurality of surge suppressing blocks 28 may be maintained in spaced stacked array and electrical communication by plural electrically conductive connector posts 32 extending between adjacent connector buses 31. Connector posts 32 are releasably interconnected with conductor buses 31 by bolts or studs as may be required threadedly extending therebetween. The connector buses of the surge suppressing block most proximal to mounting plate 23 are maintained on the associated bus bars 27 by bolts or studs 33 extending fastenably therebetween.

It is with this type of post and bus bar architecture for interconnected modular electrical components that my annunciating system is particularly adapted to operate, though it is operative in other panel box architectures with either post and bus bar or insulated flexible wire interconnections.

My annunciating system, as seen in the diagram of FIG. 3, provides actuating circuit 10 with power supply means 50, sensor means 34, and transducer 38 connected with the power supply line 35 of electrical device 36 which may sustain an electrical happening that is to be annunciated. The electrical device 36 is powered by supply line 35 and is protected by fuse 37 in that line outwardly of the electrical device 36 and the interconnection of my annunciating circuit therewith.

As seen in FIG. 4, power supply means 50 provides resistor 51, rectifying diode 52, and plural Zener diodes 53 with parallel capacitor 54 and diode 55 to provide a direct current preferably of 12 volts. This voltage is output through lead 56 to power the transmitting transducer 38.

The sensing means 34 in the device illustrated in FIG. 4 provides two parallel circuits 62 and 63 between the power input line 35 and ground line 56 of the power supply. Each of circuits 62 and 63 have two sets of paired light emitting diodes 58a and 58b coupled respectively with light sensing transistors 59a and 59b to electrically isolate the connection between these elements. Each of the paired light sensing transistors 59a are interconnected between their collectors to red light emitting diode 65 are interconnected between their emitters to transducer 38 and output by lead 56. The light sensing transistors 59b are interconnected between their collectors to power green operating light 64. The two parallel circuits 62 and 63 with their reversed rectifying diodes provide full wave operation for the sensing means.

An electrical device to be sensed is interconnected by leads 66 and 67 between the pairs of light emitting diodes and light sensing transistors of parallel circuits 62 and 63. If the electrical device does not receive power, such as by reason of a blown fuse, the event powers diode 65 and transducer 38 interconnected in electrical series between leads 56 and 60. The physical location of transducer 38 preferably is in a chamber defined by a casement of an electrical device that is serviced. Wherever transducer 38 is carried, however, care must be taken to assure that sound waves produced by that transducer may exit from any associated casement and pass into chamber 49 defined by panel box 13 or elsewhere to activate the annunciating circuit.

Sonic waves 39 generated by transmitting transducer 38 pass through the atmosphere in chamber 49 defined by panel box 13 to receiving acoustical transducer 40 carried in annunciating circuit 11. The receiving transducer 40 produces an electric signal responsive to the impinging sonic waves and passes that electric signal through line 41 to tuned amplifier 47. The tuned amplifier, after filtering the signal to purify it and amplifying it to enhance its strength at a particular frequency, similar to the sonic waves received, passes the modified signal through line 48 to time delay integrator 42. The time delay integrator 42 requires predetermined electrical conditions, that when met by the electric signals presented to it, allow passage of current through line 43 to switching device 44 to prevent accidental operation caused by noise or transients. In the instance illustrated, if sound persists for a sufficient period of time, the condenser of the integrator becomes charged and the voltage passed therefrom raises to a level that triggers the switching device. Switching device 44 responsively passes electric current to power annunciator 45 and communication equipment interface 46 to annunciate the happening of the sensed event. The time delay integrator 42 will require an activating signal, or a number of signals, over an appropriate time interval for activation, and its components may be variable to allow change in these parameters as heretofore known.

The individual components of the annunciating circuit and their use are known per se and those components may be selected for particular desired parameters from such devices available in the present day marketplace.

Receiving transducer 40 is carried within the chamber 49 defined within panel box 13 so that transducer 40 may receive acoustical signals from transmitting transducer 38 through the atmosphere in that chamber. The positioning of both transducer elements normally is at a distance from each other for my device to be useful, but that positioning must be such that the required acoustical linkage may be accomplished. Normally, the various electrical components of the annunciating circuit 11 are contained in close proximity in a casement. This annunciating circuit casement can be located anywhere within an electrical box and in the embodiment illustrated is located on the internal surface of door 21. Annunciating devices 12 communicate through the box to allow visual inspection.

Often panel boxes in which my annunciating device is used may be in remote unattended locations. If this be the case, communication interface device 46 may be used as an annunciating device to activate communications equipment, commonly of a radio or telephone type, to cause annunciation of a sensed event at a distant location. This type of interface device is well known and commercially available.

Having described the structure of a preferred embodiment of my annunciator, its operation may be understood.

An annunciating system, including activating circuit 10, annunciating circuit 11 and annunciating devices 12, is provided according to the foregoing specification.

I prefer that the acoustical transducers 38 and 40 be relatively small in size and operate in an audible acoustical range of approximately four thousand cycles per second, though this is not essential and any acoustical ranges that allow transmission of acoustical signals between transducers 38 and 40 are within the ambit and scope of my invention.

Both the elements of the activating circuit 10 and annunciating circuit 11 are preferably separately encased and each is placed at a spaced distance from the other, generally in areas of an electrical panel box where activity to be sensed and annunciated are to take place. In the embodiment illustrated, the activating circuitry 10 is contained within the casements of surge suppression blocks 28 and the annunciating circuitry 11 is carried within the panel box chamber 49 with light-type annunciators 64, 65 carried in orifices defined in the panel box to be visible exteriorly thereof. No wiring will be required between these encased circuits and my annunciating system therefore requires no flexible wiring interconnections within the chamber defined by the panel box.

As an event to be annunciated, such as breaking of a fusing link electrical device 36, sensing means 34 will sense that event and responsively transmit a signal to transmitting transducer 38 to responsively cause that transducer to emit sonic waves 39 within the chamber of the panel box 13. These sonic waves will be transmitted through that chamber and to receiving transducer 40 which responsively will transmute the sonic energy into an electric signal which will be passed through line 41 to tuned amplifier 47 which amplifies and purifies that signal in a predetermined frequency range. The enhanced signal then is passed through line 48 to time delay integrator 42. When the appropriate precedent conditions of the time delay integrator have been met and its condenser appropriately charged, it will raise the output voltage to operate switching devices 44 which responsively activates annunciator 45, communication interface 46 and indicator lights 64, 65 to cognizably annunciate the occurrence of the sensed event at the panel box and at a distance.

From the foregoing description, it is to be noted that if a plurality of my annunciating devices are to be carried within a single panel box, acoustical signals used by each may be at different frequencies so that one transmitting transducer will activate only its frequency mated receiving transducer to annunciate an event only in the electrical device associated with those two transducers. This allows singulated data as to a particular electrical device that is a member of a group of such devices in a single box. In other applications, if it be desired to annunciate only the sensation of an event in any one of a plurality of electrical components, only one receiving transducer need be used with a plurality of frequency mated transmitting transducers in each of the electrical devices to be sensed. Various other permutations and combinations of frequency matings of transmitting and receiving transducers are also within the ambit and scope of my invention.

Referring to FIG. 5, a power surge protection assembly 68 includes multiple components 14 also referred to as suppression boxes 14 similar to those shown in FIG. 2. The surge protection assembly 68 also includes a half-sized suppression box 70 connected side-by-side with suppression boxes 14. The suppression box 70 includes power surge protection components 72 shown in detail in FIG. 6. The suppression box 70 is the same length as the suppression boxes 14 but approximately half the width.

The suppression boxes 70 can include the annunciation circuitry shown in FIG. 3 and the multi-level monitoring circuitry described in co-pending application entitled: A POWER SURGE SUPPRESSION SYSTEM WITH MULTI-LEVEL STATUS ANNUNCIATION CIRCUITRY, Ser. No. 08/688,327 filed Jul. 30, 1996, which is herein incorporated by reference.

The smaller sized suppression box 70 is coupled between a neutral line 74 via bus bar 77 and ground via bus bar 76. The suppression box 70 comprises flat elongated top and bottom surfaces 71 and sides 73 that extends perpendicularly from the top to the bottom surfaces 71. The smaller size of suppression box 70 in relation to suppression box 14 allows a wider variety of power surge protection arrangements. For example, the larger suppression boxes 14 provide additional surge suppression protection between power lines 69 and 75 and neutral line 74. The smaller suppression box 70 can be used to provide additional power surge protection between the neutral line 74 and ground. With the three phase power applications, the smaller suppression box 70 also can provide line to line, line to neutral, and neutral to ground power surge protection. The smaller size of the suppression box 70 allows insertion in panel boxes that also include service entrance, transfer switch and load center systems.

Figure 6:
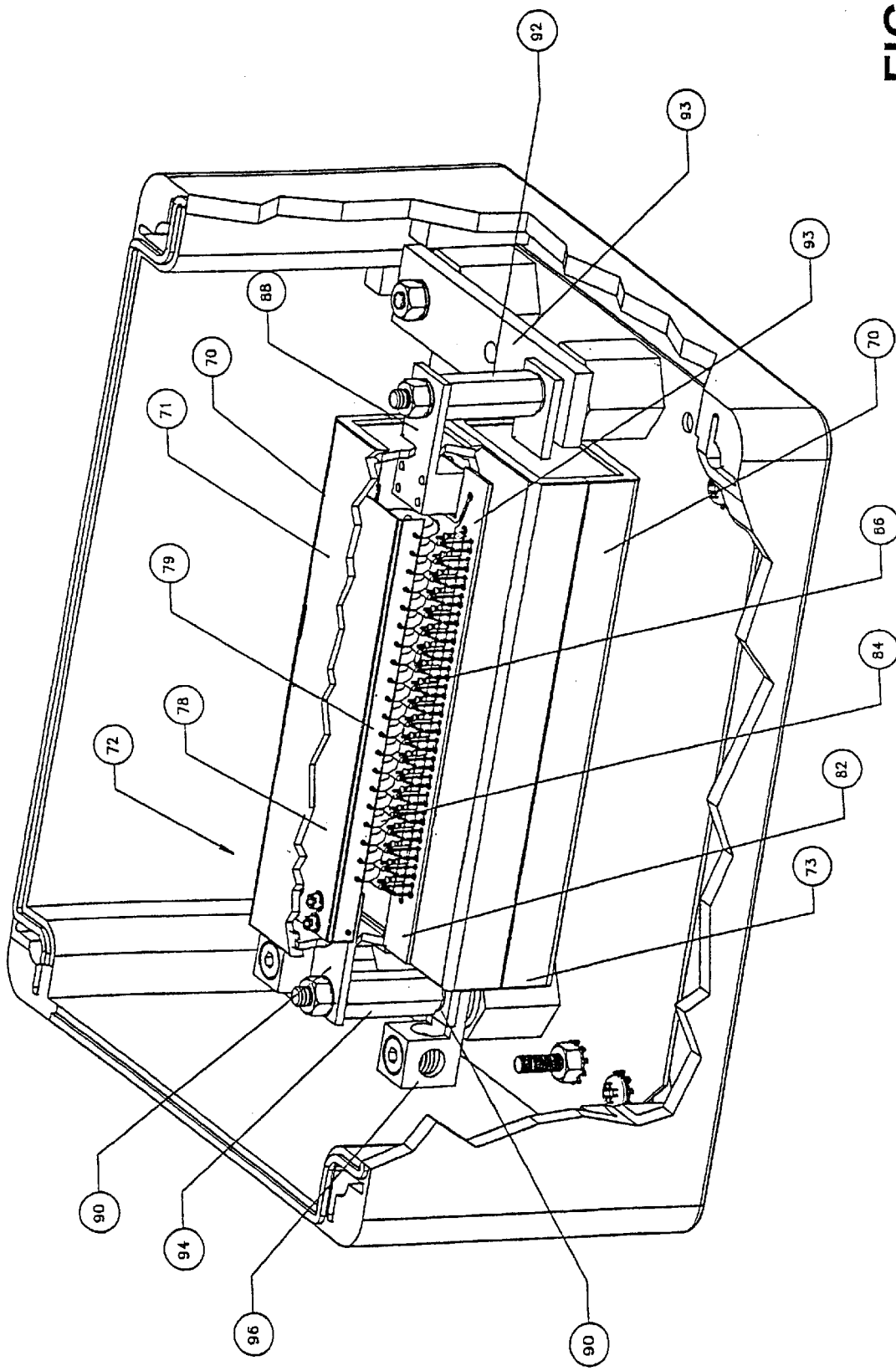
FIG. 6 is a perspective cut-away view of two half-sized surge suppression boxes inside an electrical panel.

Referring to FIG. 6, two suppression boxes 70 are vertically coupled together at a first end by a connector post 92 and at a second end by a connector post 94. The post 92 electrically couples the conductors 88 together with bus bar 93 that is coupled to ground. The post 94 electrically couples the conductors 90 together with a terminal 96 coupled to a neutral line 74 (FIG. 5).

The suppression box 70 includes a substantially flat elongated rectangular bus bar 80 extending from the conductor 88 underneath a printed circuit board 82 along substantially the entire length of the suppression box 70. A second substantially flat elongated bus bar 78 extends from the conductor 90 along substantially an entire length of the suppression box 70 overlapping the first bus bar 80. Multiple metal oxide varistors (MOVs) 84 are coupled in parallel between a flange 79 extending downward from the side of bus bar 78 and bus bar 80. The MOVs 84 extend along substantially the entire length of the two bus bars 78 and 80 via printed circuit board 82.

Multiple resistors 86 are each electrically coupled at a first end with an associated one of the MOVs 84 and coupled at a second end to a multi-level monitoring circuit described in co-pending patent application, Ser. No. 08/688,327. The unique overlapping arrangement of the elongated bus bars 78 and 80 allow a larger number of MOVs 84 to be populated inside a relatively small suppression box 70. The MOVs 84 in suppression box 70 provide over 3000 joules of surge suppression protection.

Figure 7:
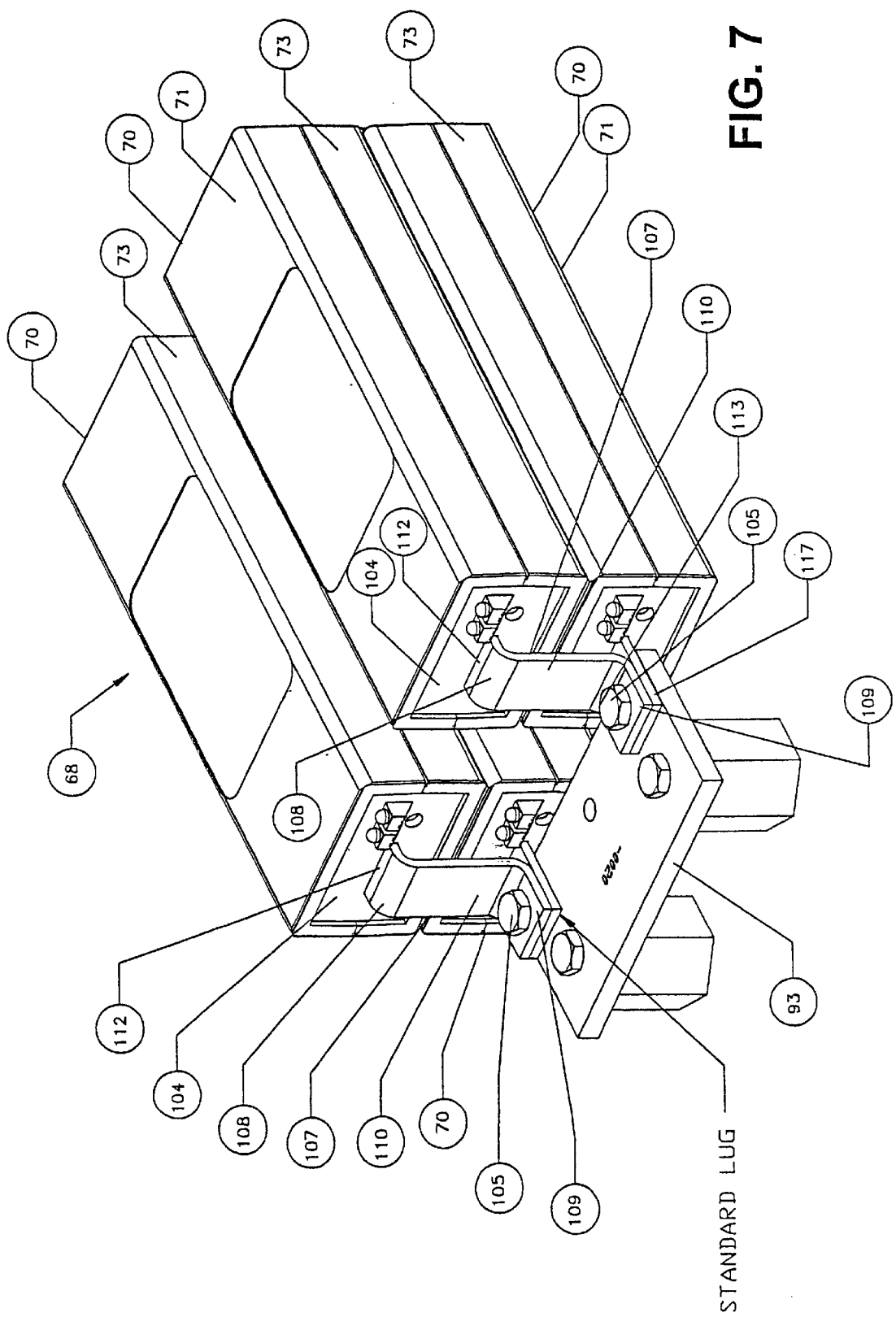
FIG. 7 is a perspective view of four surge suppression boxes stacked according to a first embodiment of the present invention.

FIG. 7 is a perspective view of four surge suppression boxes 70 stacked according to an embodiment of the present invention. Two second-tier surge suppression boxes 70 are stacked on top of and are vertically coupled to two first-tier surge suppression boxes 70. Each of surge suppression boxes 70 comprise a flat elongated top and bottom surfaces 71, sides 73 extending perpendicularly from the top to the bottom surfaces 71, and ends 104 extending perpendicularly from the top and bottom surfaces 71 and at right angles to sides 73.

Each of the first-tier surge suppression boxes 70 include a short substantially flat conductor 117 for mechanically and electrically coupling surge suppression boxes 70 with bus bar 93 which is preferably coupled to either ground, neutral or a phase of a power line. Short conductor 117 extends outwardly from end 104 substantially parallel to top and bottom sides 71.

Each of the second-tier surge suppression boxes 70 include an elongated curved conductor 107 for mechanically and electrically coupling surge suppression boxes 70 with bus bar 93. Elongated conductor 107 has a substantial step or -s- shape which includes a flat portion 112 extending outwardly from end 104 substantially parallel to top and bottom surfaces 71. Elongated conductor 107 also includes flat portion 110 which extends substantially parallel to end 104 and flat portion 109 which extends substantially parallel to top and bottom surfaces 71. Flat portion 112 is connected to flat portion 110 by corner portion 108 and flat portion 110 is connected to flat portion 109 by corner portion 113.

Flat portion 109 of elongated conductor 107, short conductor 117, and bus bar 93 each have a bore (not shown) for receiving connector 105. When surge suppression boxes are stacked as shown in FIG. 7, the bores of elongated conductor 107, short conductor 117, and bus bar 93 vertically align for receiving the shaft of connector 105. Connector 105 secures elongated conductor 107 and short conductor 117 to bus bar 93. In the preferred embodiment, connector 105 is a bolt threadably received in a threaded bore in bus bar 93 or by a nut (not shown) threadedly receiving and interlocking with the bolt 105 at a bottom side of bus bar 93.

Figure 8:
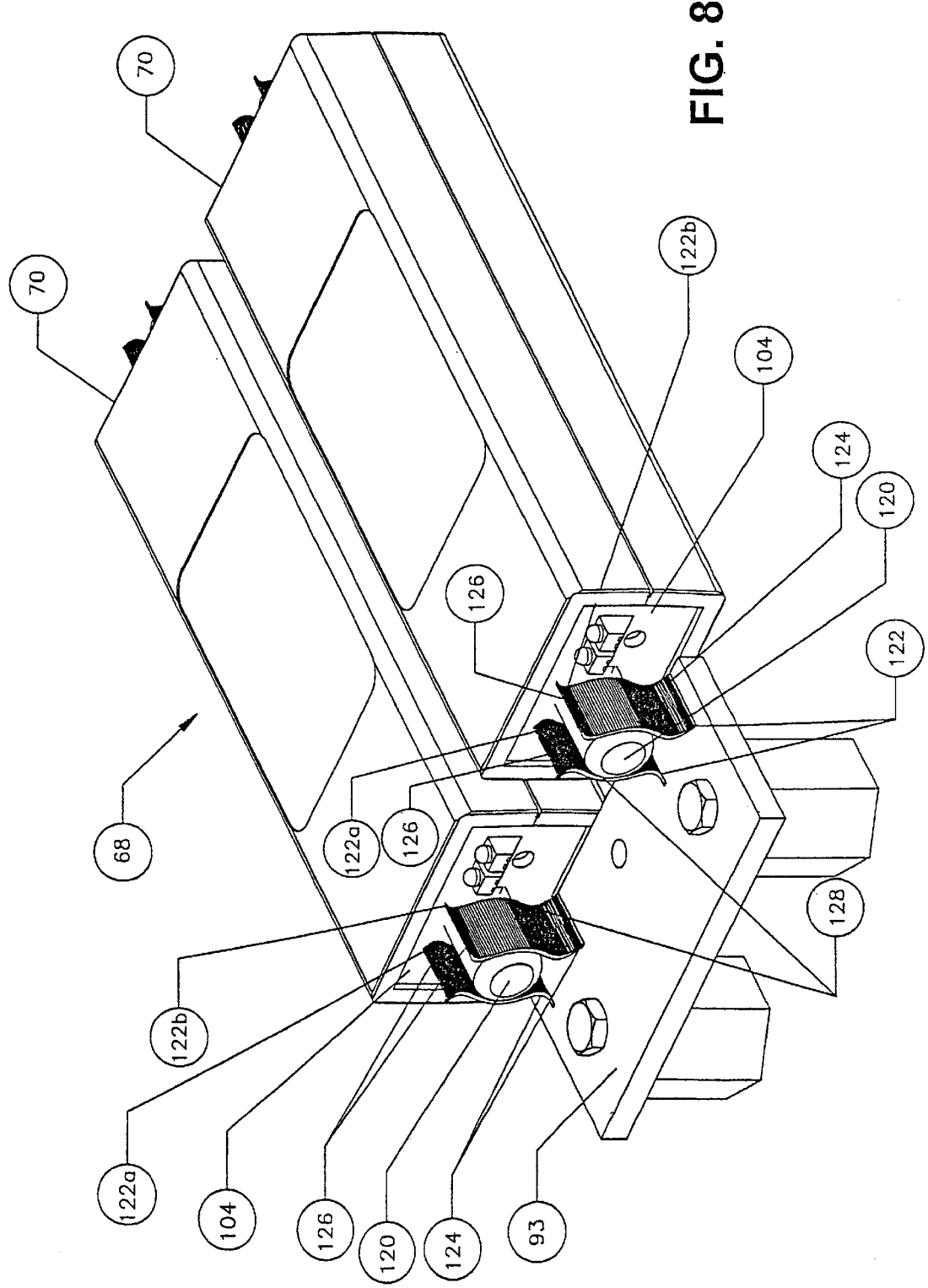
FIG. 8 is a perspective view of two surge suppression boxes attached side-by-side according to a second embodiment of the present invention.

Referring to FIG. 8, power surge protection assembly 68 includes surge suppression boxes 70 connected side-by-side to each other and to bus bar 93. Bus bar 93 includes snap ring 122 having members 122a and 122b made of a conductive material. Snap ring 122 is attached, for example by a spot weld, at a first end 124 and extends substantially perpendicular to bus bar 93. Members 122a and 122b have identical curved profiles, however, member 122a is attached to bus bar 93 such that it is an oppositely aligned mirror image of member 122b as shown in FIG. 8. Thus, snap ring 122 substantially narrows at both a first bottom end 124 and a second top end 126 with a wider almost circular middle portion 128.

Surge suppression boxes 70 include a post 120 having a substantially cylindrical shape and extending outwardly from ends 104. Post 120 is made of a conductive material. Post 120 is introduced into snap ring 122 at the top open end 126. By applying a small amount of downward force to post 120, snap ring members 122a and 122b temporarily separate allowing post 120 to snap into middle portion 128. At this time, snap ring members 122a and 122b return to their original position, retaining post 120. By snapping post 120 into snap ring 122, surge suppression boxes 70 are electrically and mechanically coupled to bus bar 93 and to each other. Similar snap rings are used on the opposite ends of surge suppression boxes 70 for connecting to another bus bar connected to either a neutral, ground or power phase of the power line (not shown)

Figure 9:
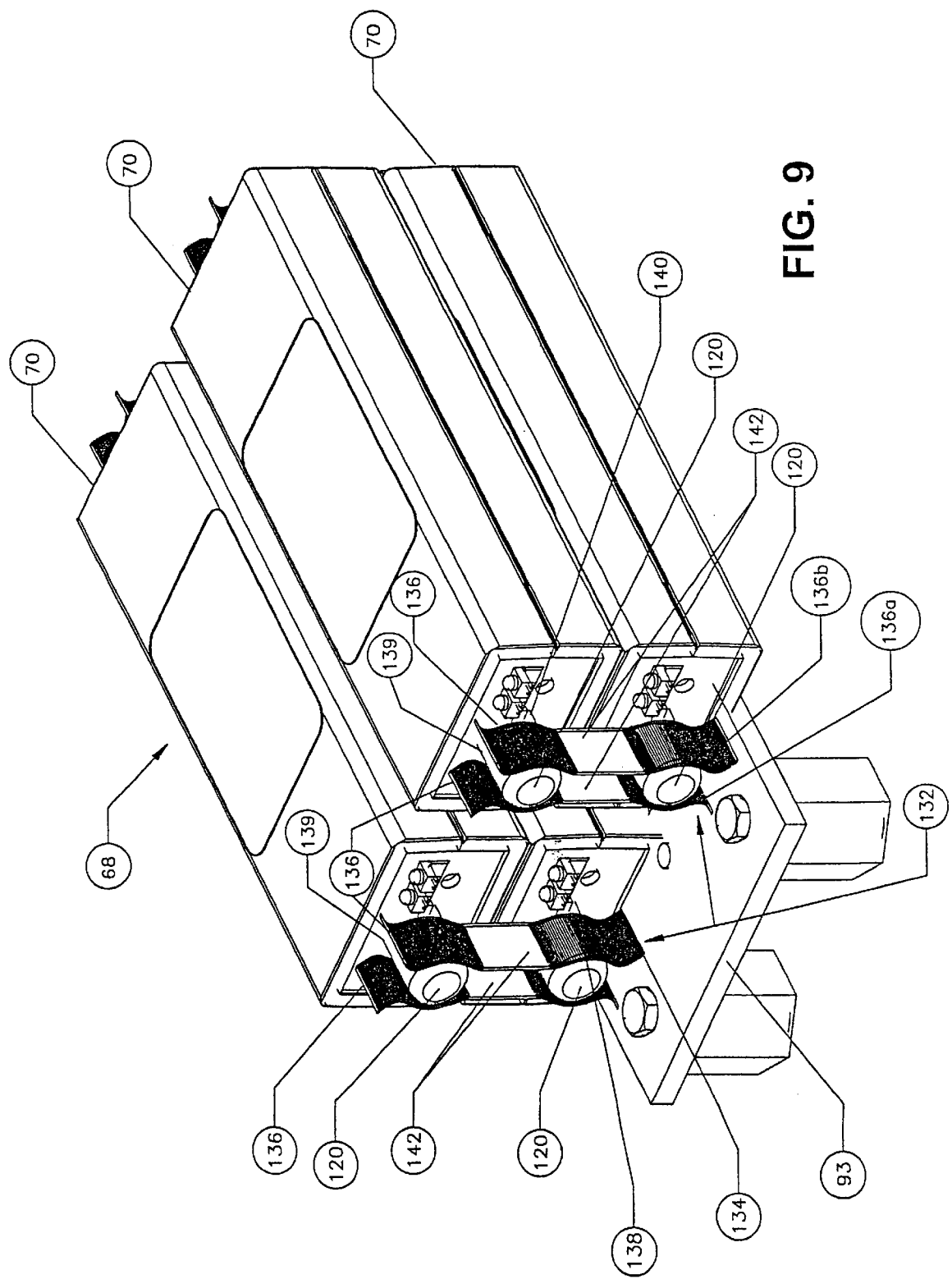
FIG. 9 is a perspective view of four surge suppression boxes stacked according to a third embodiment of the present invention.

FIG. 9 is a perspective view of a two-tier power surge protection assembly 68 using elongated snap rings 132. Bus bar 93 includes elongated snap ring 132 having members 132a and 132b made of a conductive material such as steel. As with snap ring 122, elongated snap ring 132 is attached at a first end 134 to bus bar 93, with an electrically conductive adhesive or spot weld, and extends perpendicularly from bus bar 93. Members 132a and 132b have identical curved profiles. However, member 132a is attached to bus bar 93 in opposite alignment forming a mirror image of member 132b as shown in FIG. 9. Each of snap ring members 132a and 132b include an extension portion 142 between two middle portions 138 and 140. Elongated snap ring 132, thus, narrows at a first bottom end 134, a second top end 136, and through extension portion 142 with the two wider almost circular portions 138 and 140 located between first bottom end 134 and extension portion 142 and between extension portion 142 and second top end 136, respectively. Similar clip assemblies are used on the opposite ends of surge suppression boxes 70.

Post 120 of the first-tier surge suppression boxes 70 is introduced first into channel 135 at top end 136 of elongated snap ring 132. By applying a small amount of downward force to post 120, elongated snap ling members 132a and 132b temporarily separate allowing post 120 to slide through channel 135 past middle portion 140 and extension portion 142 snapping into middle portion 138. Similarly, post 120 of the second-tier surge suppression box 70 is introduced into channel 135 and snapped into middle portion 140. Since middle portions 138 and 140 are wider, middle portions 138 and 140 receive posts 120 of the first and second-tier boxes 70, respectively, allowing snap ring members 132a and 132b to return their original position once posts 120 are in place. By snapping posts 120 into elongated snap ring 132, surge suppression boxes 70 are electrically and mechanically coupled to bus bar 93 and to each other.

Figure 10:
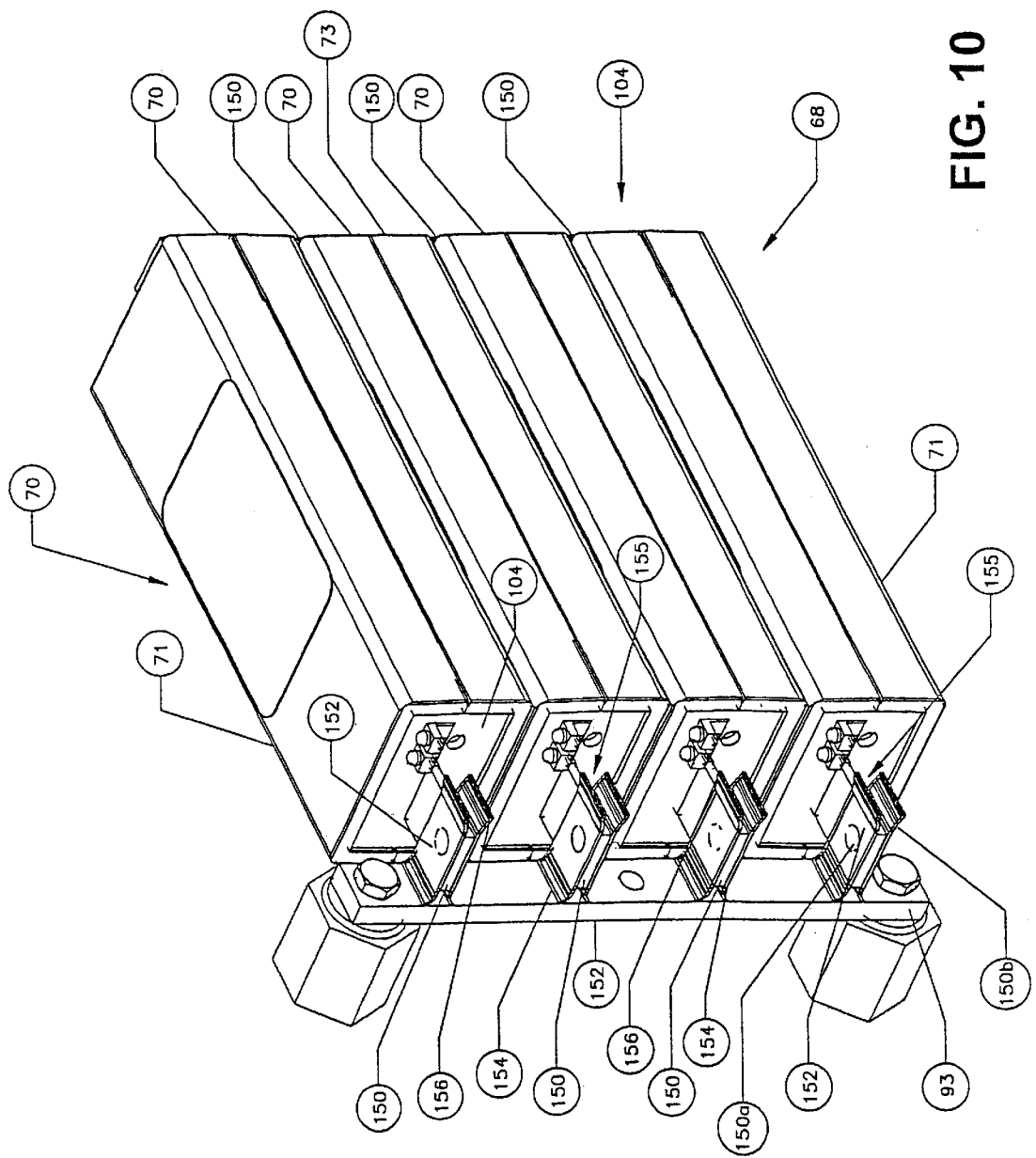
FIG. 10 is a perspective view of four vertically oriented surge suppression boxes stacked according to a fourth embodiment of the present invention.

An alternative embodiment of the present invention is shown in FIG. 10. Surge suppression boxes 70 are turned ninety degrees such that top and bottom sides 71 are perpendicular to the longitudinal plane of bus bar 93 and sides 73 are parallel to the longitudinal plane of bus bar 93. Four surge suppression boxes 70 are placed side-by-side. Each surge suppression box 70 includes rectangular substantially flat conductors 150 extending outwardly from opposite ends 104.

Clip 152 extends substantially perpendicularly from the top surface of bus bar 93 and includes clip members 152a and 152b made of a conductive material, a first end 154, a second open end 156, and a channel 155 located between clip members 152a and 152b. Clip 152 if welded, formed, clipped or glued at a first end 154 to bus bar 93. Clip members 152a and 152b have a substantially rectangular shape and include second open ends 156 which angle away from each other for aiding conductor 150 into channel 155. Once conductor 150 is positioned between clip members 152a and 152b, surge suppression box 70 is electrically and mechanically coupled to bus bar 93. It should be clear to a person skilled in the art that the assembly 68 shown in FIG. 10 can be used to attach surge suppression boxes 70 and conductors 150 which are turned ninety degrees such that top and bottom sides 71 are parallel to bus bar 93.

Figure 11:
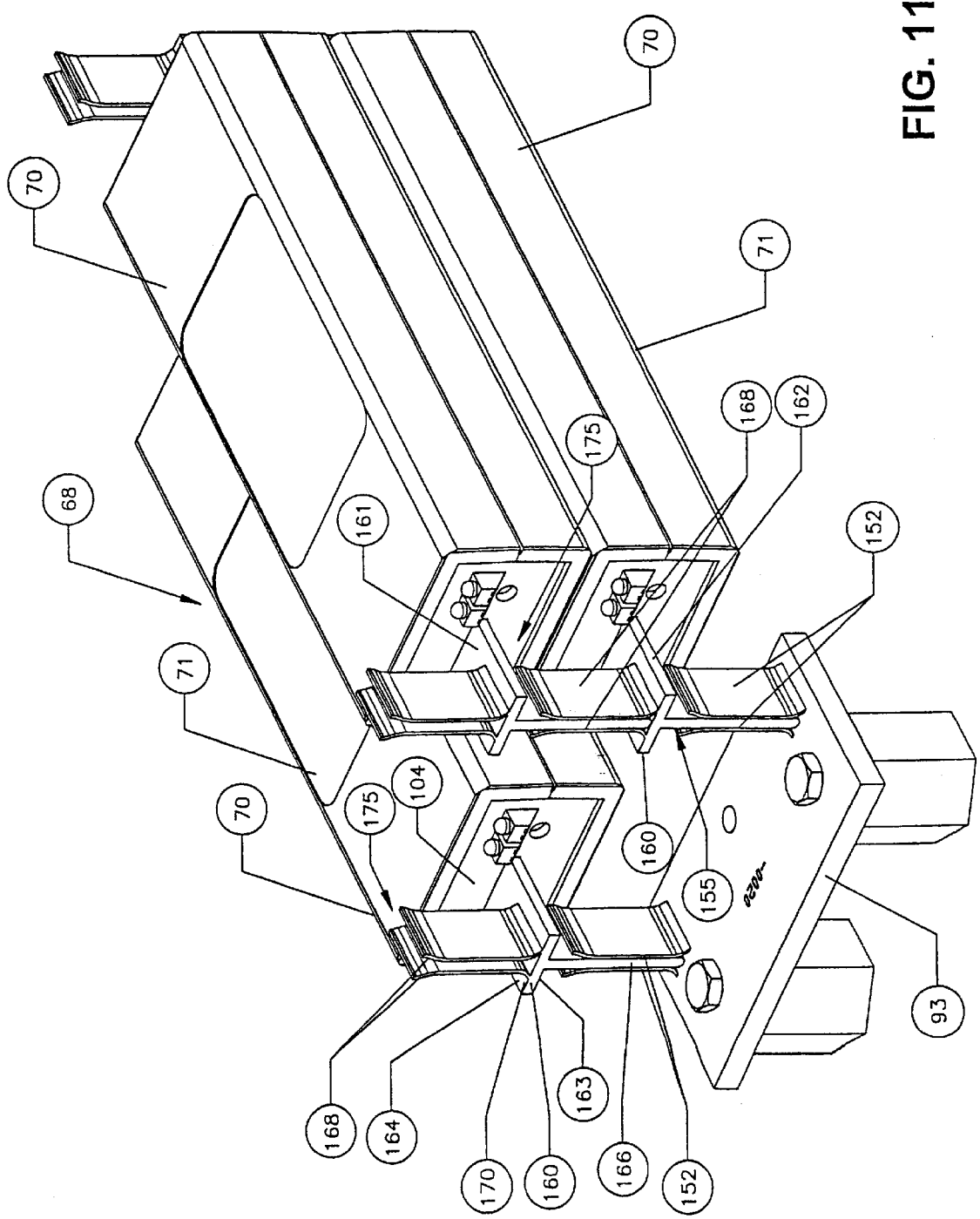
FIG. 11 is a perspective view of three surge suppression boxes stacked according to a fifth embodiment of the present invention.

In the assembly shown in FIG. 11, a t-shaped conductor 160 extends from opposite ends 104 of each surge suppression box 70. As with the assembly 68 shown in FIG. 10, bus bar 93 includes a clip 152 attaching to bus bar 93 at a first end 154 and extending substantially perpendicularly from a top surface of bus bar 93. T-shaped conductor lug 160 includes a first flat portion 162 substantially parallel to top and bottom sides 71 and a second flat portion 166 extending perpendicularly downward from the center bottom side 163 of first portion 162. A clip 168 is formed or attached at a first end 170 to the top side 164 of first flat portion 162. In the presently preferred embodiment, clip 168 is identical to clip 152 except that clip 168 is permanently attached to flat portion 162 of t-shaped lug 160 and clip 152 is permanently attached to bus bar 93.

The first-tier of surge suppression boxes 70 is attached to bus bar 93 by introducing second flat portion 166 of t-shaped conductor lug 160 into channel 155 of clip 152. Similarly, the second tier of surge suppression boxes 70 is attached to bus bar 93 and to the first tier of surge suppression boxes 70 by introducing t-shaped conductor 161 into channel 175 of clip 168. It should be apparent that although a two-tier system is shown, more than two tiers of surge suppression boxes 70 can be stacked using the embodiment of FIG. 11.

Figure 12:
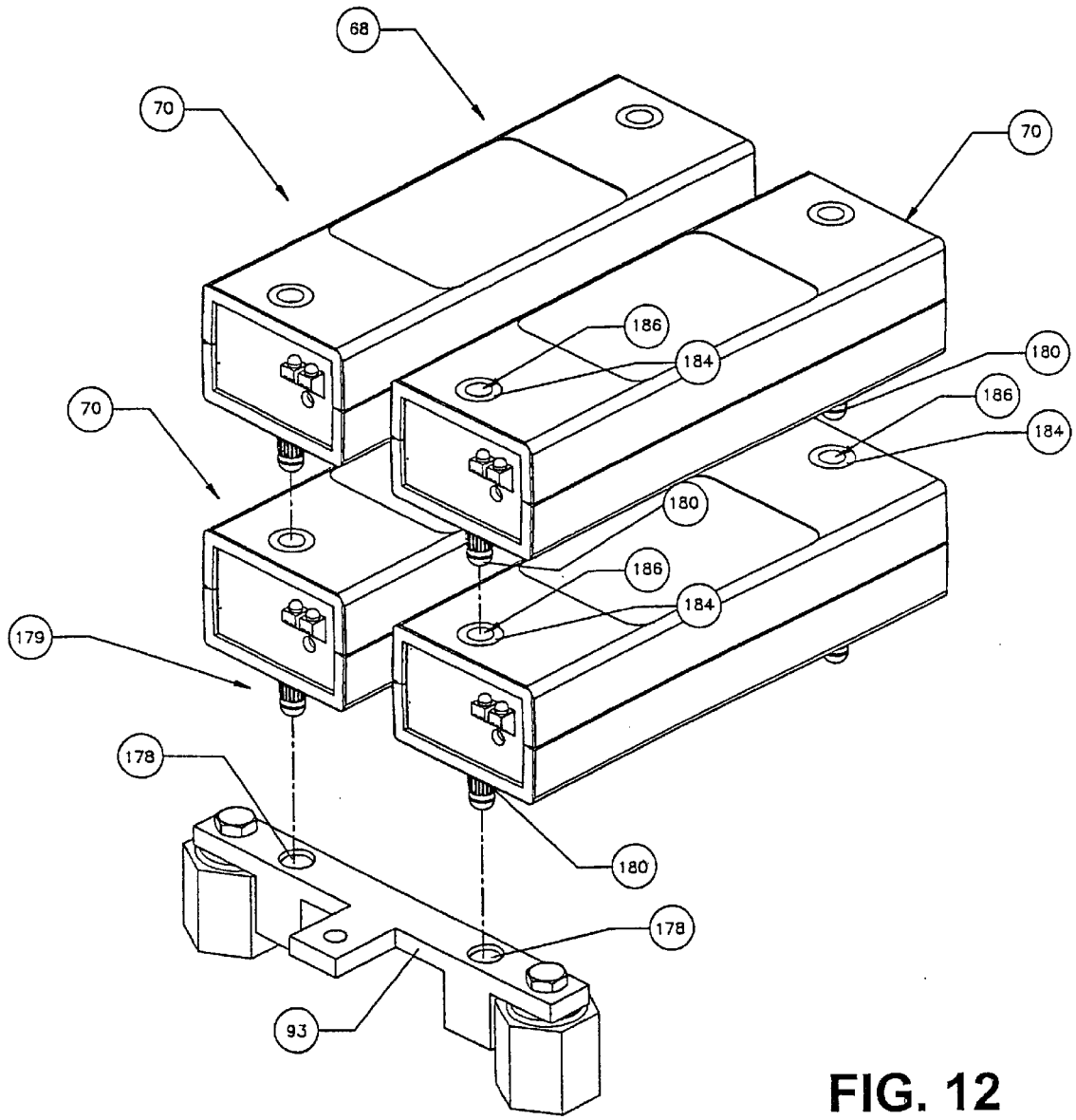
FIG. 12 is a perspective view of four surge suppression boxes stacked according to a sixth embodiment of the present invention.
Figure 13:
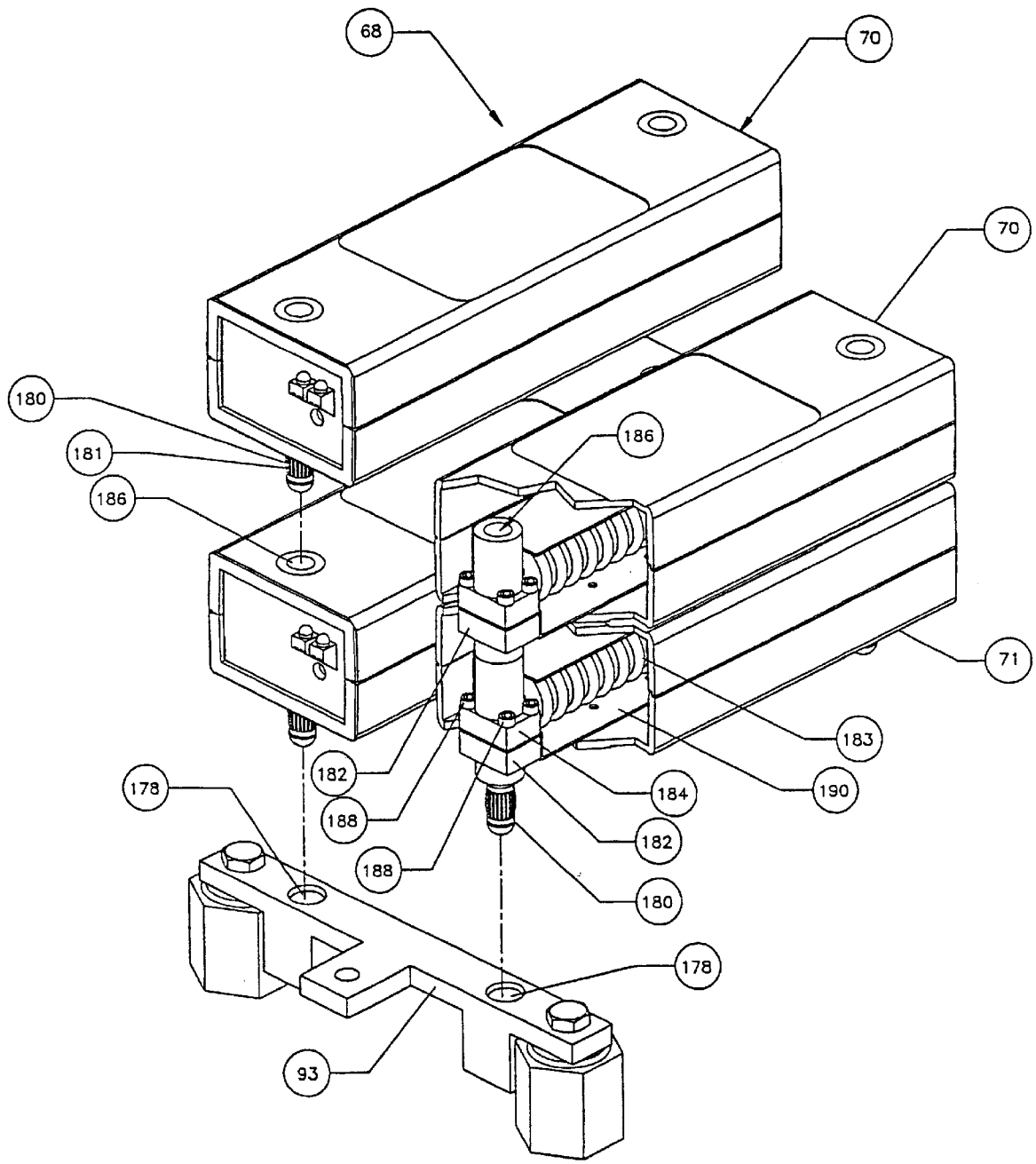
FIG. 13 is a perspective cut-away view of four surge suppression boxes stacked according to the embodiment of FIG. 12.
Figure 14:
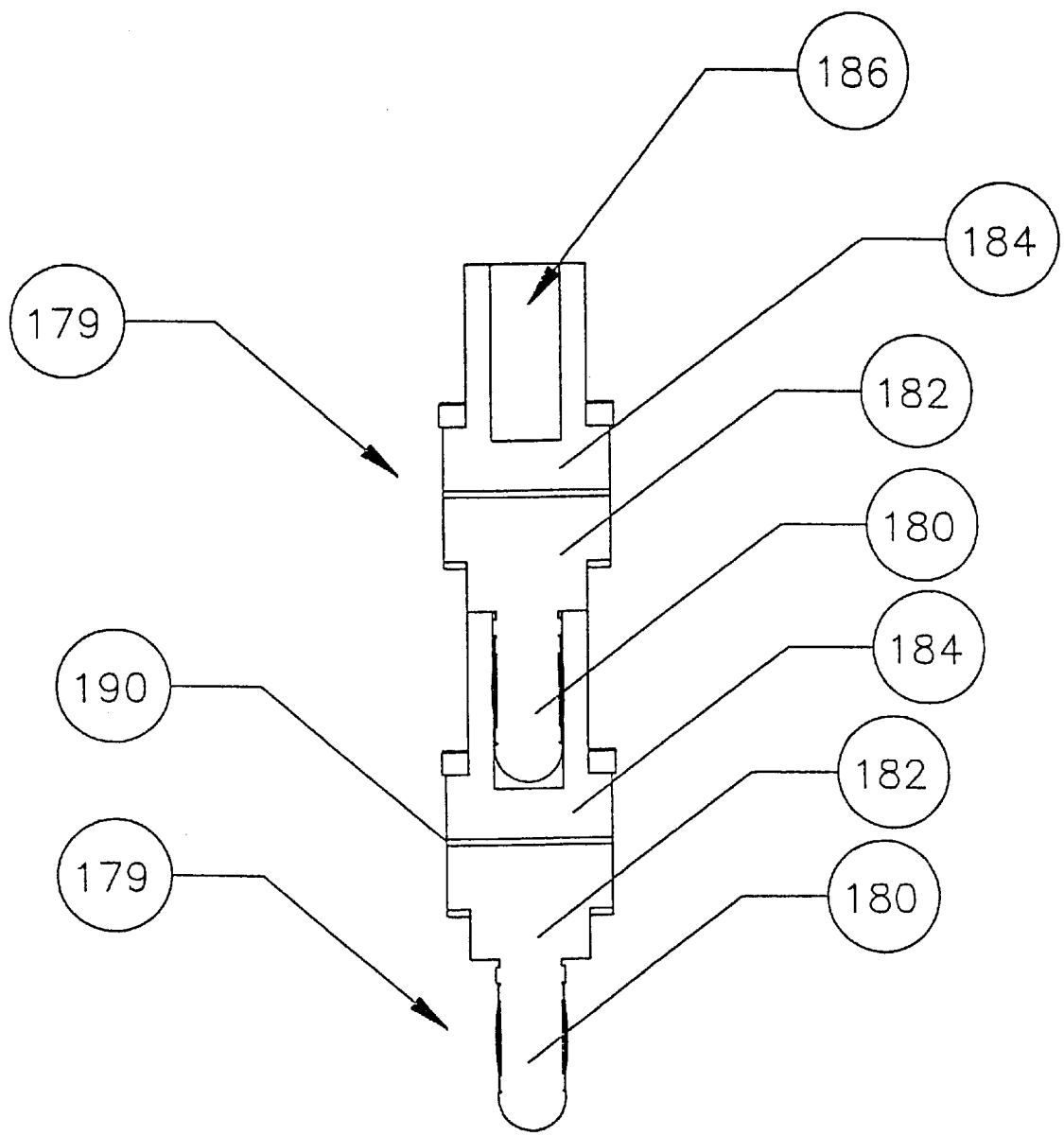
FIG. 14 is a detailed side view of the plug assembly shown in FIGS. 12 and 13.

Referring now to FIGS. 12–14, a plug assembly 179 is used to electrically and mechanically couple surge suppression boxes 70 to bus bar 93 and to each other. Plug assembly 179 extends perpendicularly from bottom side 71 of surge suppression box 70. Plug assembly 179 includes plug 180 which extends from plug body 182. Plug 180 is substantially cylindrically shaped and made of a conductive material such as steel or iron. Plug 180 includes a plurality of striations 181 which flex slightly inward when plug 180 is introduced into bore 178 causing an continuous outward force to be exerted on the walls forming bore 178 which holds plug 180 in place and improves the connection between plug assembly 179 and bus bar 93. By inserting plug 180 of the first tier surge suppression boxes 70 into bore 178, surge suppression boxes 70 are electrically coupled to bus bar 93 and to rectangular bus bar 190 extending from plug assembly 179 along substantially the entire length inside surge suppression box 70. The bus bar 93 is used for connecting to one end of each surge suppression device 183 inside surge suppression box 70.

If two or more surge suppression boxes 70 are stacked on top of each other, a plug receiving portion 184 is optionally attached to plug body 182 inside the surge suppression box 70 using connectors 188 as shown in FIG. 13. Plug receiving portion 184 extends upwardly from plug body 182 and includes a cavity 186. Plug receiving portion 184 receives plug 180 of the second-tier surge suppression box 70 as shown in FIGS. 13–14. By doing so, the second tier surge suppression box 70 is electrically and mechanically coupled to the first tier surge suppression box 70 and to bus bar 93.

Figure 15:
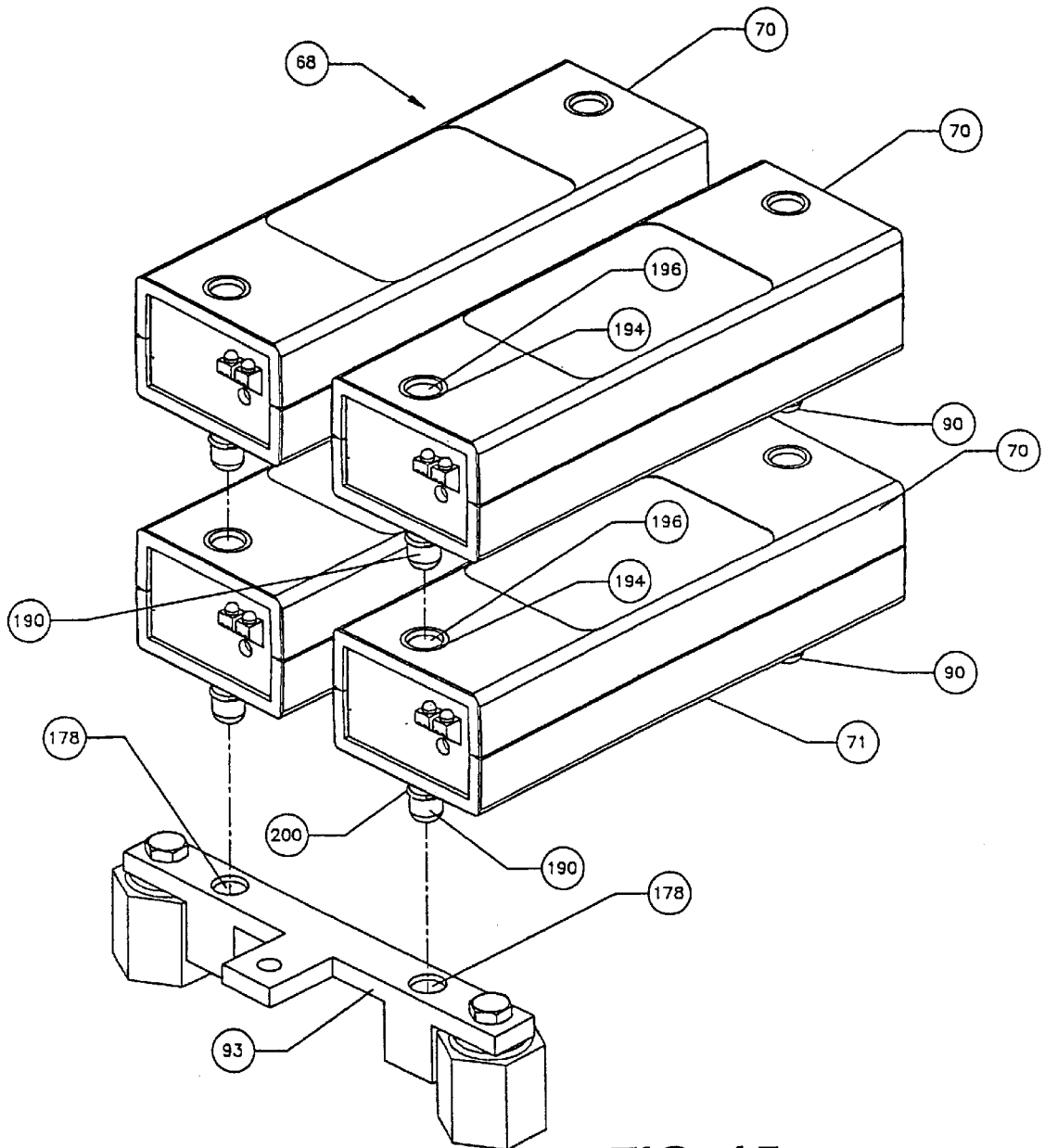
FIG. 15 is a perspective view of four surge suppression boxes stacked according to a seventh embodiment of the present invention.
Figure 16:
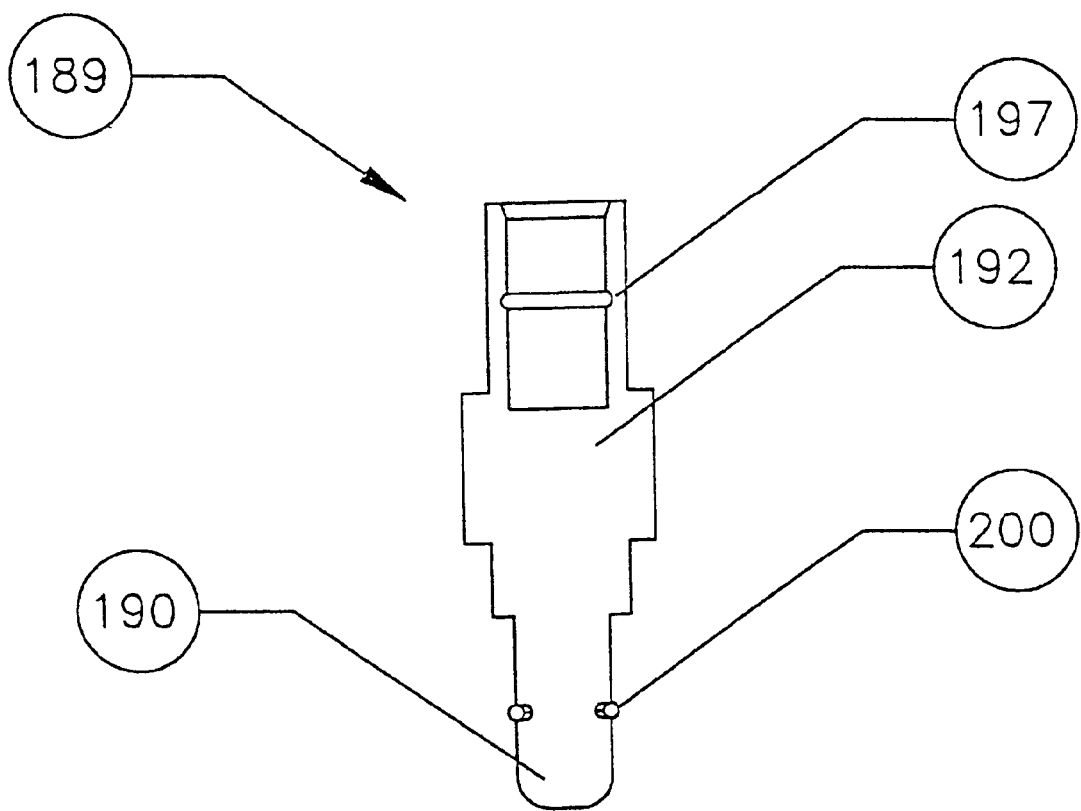
FIG. 16 is a perspective cut-away view of four surge suppression boxes stacked according to the embodiment of FIG. 15.
Figure 17:
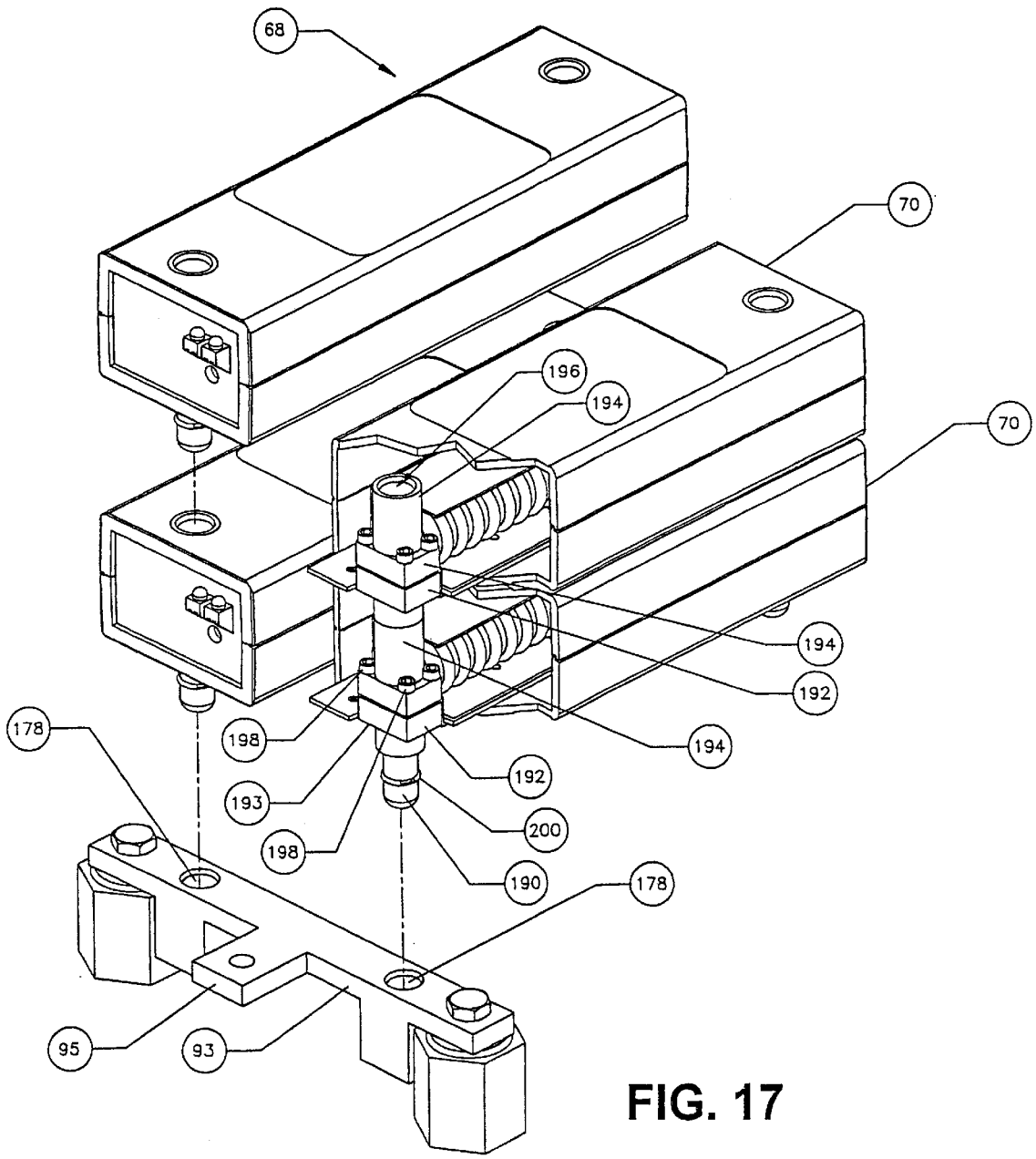
FIG. 17 is a detailed cut-away perspective view and cut-away side view of the plug assembly shown in FIGS. 15 and 16.
Figure 18:
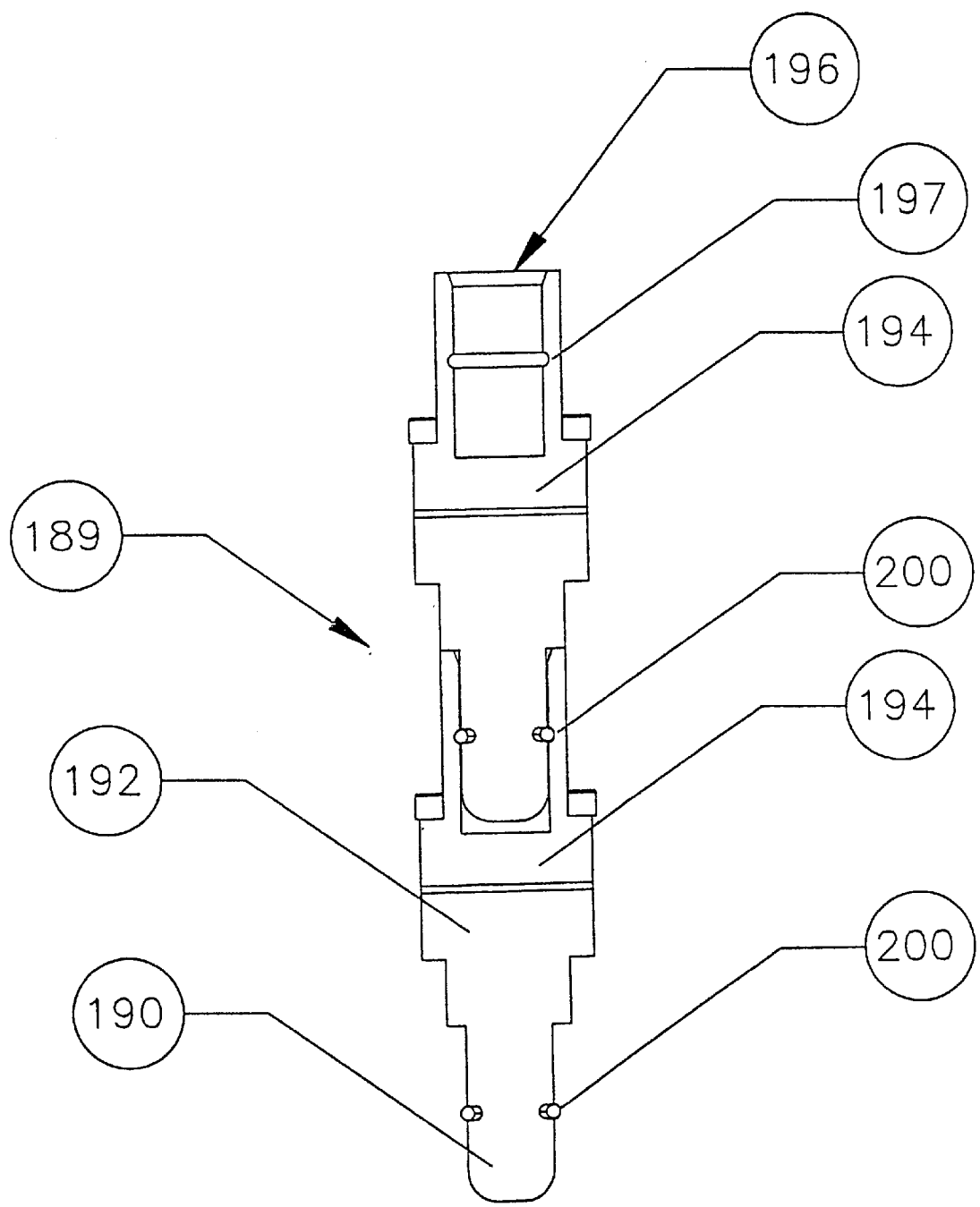
FIG. 18 is a detailed side view of the plug assembly shown in FIG. 17.

An alternate embodiment of the present invention is shown in FIGS. 15–17. Plug assembly 189 electrically and mechanically couples surge suppression boxes 70 to bus bar 93 and to each other. Plug assembly 189 extends perpendicularly from bottom side 71 of surge suppression box 70. Plug assembly 189 includes a plug 190 which extends from plug body 192. Plug 190 is substantially cylindrically shaped and made of a conductive material.

Plug 190 includes a retaining ring 200. Retaining ring 200 extends around the outer diameter of plug 190 and is positioned a distance below plug body 192 such that after plug 190 is inserted into bore 178, a bottom surface 193 of plug body 192 is substantially against a top surface 95 of bus bar 93. Retaining ring 200 is preferably made of a conductive metal, spring material or ball bearing assembly or the like which deforms slightly to allow plug 190 to be inserted into bore 178. Once plug 190 is in position, retaining ring 198 regains its original shape. In this manner, retaining ring 200 secures plug 190 in bore 178 thereby coupling surge suppression box 70 with bus bar 93.

If two or more surge suppression boxes 70 are stacked on top of each other, a plug receiving portion 194 is optionally attached to plug body 192 using connector screws 198. As with receiving portion 184, receiving portion 194 extends upwardly from plug body 192 and includes a cavity 196. Plug receiving portion 194 and bus bar 93 each include a retaining ring channel 197 formed in cavity 196 and 178, respectively which receive retaining rings 200 of plug assembly 189 of the first or second tier surge suppression boxes 70. Retaining ring channel 197 is positioned such that when plug 190 is fully inserted into cavity 196, retaining ring 200 regains its original shape and fits securely in retaining ring channel 197.

Having described and illustrated the principles of the invention in a preferred embodiment thereof, it should be apparent that the invention can be modified in arrangement and detail without departing from such principles. For example, the relative orientation of surge suppression boxes 70 to bus bar 93 can be easily modified as shown in FIG. 10 without departing from the ambit of the present invention. I claim all modifications and variation coming within the spirit and scope of the following claims:

We claim:

1. A power surge protection assembly, comprising:
   a bus bar for coupling to a power line;
   a first suppression box having a top surface, a bottom surface, sides, and ends for encasing a first power protection circuit;
   a first plug body substantially enclosed within the first suppression box and coupled to the first power protection circuit; and
   a first plug attached to the first plug body and extending from the first suppression box slidingly insertable inside a bore in the bus bar, coupled to the first power protection circuit, and received in the bore for electrically coupling the first suppression box to the power line;
   wherein the first plug assembly includes a first jack portion connected to the first plug body, the first jack portion and the first plug body being substantially enclosed inside of the first suppression box and coupled to the first power protection circuit.

2. An assembly according to claim 1 wherein the first plug has a substantially cylindrical shape.

3. An assembly according to claim 1 wherein the first plug includes conductive striations substantially covering an outer diameter of the first plug, the conductive striations being substantially lengthwise along a length of the first plug.

4. An assembly according to claim 1 wherein the first plug includes a depressible annular ring for securing the first plug to the bus bar.

5. A power surge protection assembly, comprising:
   a bus bar for coupling to a power line;
   a first suppression box having a top surface, a bottom surface, sides, and ends for encasing a first power protection circuit;
   a first plug assembly extending from the first suppression box slidingly insertable inside a bore in the bus bar, coupled to the first power protection circuit, and received in the bore for electrically coupling the first suppression box to the power line, the first plug assembly including a first conductive plug extending substantially outward from the bottom side of first suppression box, a first plug body attached to the first conductive plug and connected to the first power protection circuit substantially inside of the first suppression box, and a first jack portion connected to the first plug body substantially inside of the first suppression box and coupled to the first power protection circuit;
   a second suppression box stacked on top of the first suppression box having a top surface, a bottom surface, sides, and ends for encasing a second power protection circuit; and a second plug assembly extending from the second surge suppression box, coupled to the second power protection circuit, and slidingly insertable in the first plug assembly for electrically coupling the second suppression box to the first suppression box and to the power line.

6. An assembly according to claim 5 wherein the second plug assembly includes a second plug having a substantially cylindrical shape and extending outward from the bottom side of the second suppression box, the second plug being received in the first jack portion substantially inside the first suppression box.

7. An assembly according to claim 5 wherein:
the first plug is substantially cylindrical and includes a first annular ring along substantially the entire outer perimeter for securing the first plug to the bus bar jack;
the second plug is substantially cylindrical and includes a second annular ring along substantially the entire outer perimeter for securing the second plug to the first jack portion; and
the first jack portion includes a ring channel positioned along substantially an inner perimeter of the first jack portion for securing the second annular ring when the second plug is introduced into the first jack portion.

8. A power surge protection assembly, comprising:
a bus bar coupled to ground, the bus bar having a bore;
a first suppression box having a top surface, a bottom surface, sides, and ends for encasing a first power protection circuit; and
a first plug assembly having a first plug extending substantially outward from the bottom surface of the first suppression box and connected to the first power protection circuit inside the first suppression box, the first plug being received in the bus bar bore for electrically coupling the first power protection circuit to ground, the first plug assembly including a first plug receiving member connected to the first plug and to the first power protection circuit inside of the first suppression box, the first plug receiving member being accessible and substantially flush with the top surface of the first suppression box.

9. An assembly according to claim 8 wherein the first plug is substantially cylindrical and includes conductive striations substantially covering an outer diameter of the first plug for retaining the first plug in the bore, the conductive striations being substantially lengthwise along a length of the first plug.

10. An assembly according to claim 8 wherein the first plug is substantially cylindrical and includes an annular ring around an outer diameter of the first plug for retaining the first plug in the bore.

11. An assembly according to claim 8 including:
a second suppression box stacked on top of the first suppression box having a top surface, a bottom surface, sides, and ends for encasing a second power protection circuit; and
a second plug assembly having a second plug extending substantially outward from the bottom surface of the second suppression box and connected to the second power protection circuit inside the second suppression box, the second plug being received in the first plug receiving member for electrically coupling the second power protection circuit to the first power protection circuit and to ground.

12. An assembly according to claim 11 wherein the first and second plugs are substantially cylindrical and include a first and second annular ring around an outer diameter of the first and second plugs, respectively, and wherein the first plug receiving member includes a first annular ring channel for receiving the second annular ring and retaining the second plug in the first receiving member.

13. An assembly according to claim 11 wherein the second plug assembly includes a second plug receiving member connected to the second plug and to the second power protection circuit inside of the second suppression box, the second plug receiving member being accessible and substantially flush with the top surface of the second suppression box.

14. An assembly according to claim 13 wherein the second plug receiving member includes a second annular ring channel for receiving a third annular ring on a third plug of a third suppression box and retaining the third annular ring in the second plug receiving member.

15. An assembly according to claim 8 wherein the first plug is substantially cylindrical and includes conductive striations substantially covering an outer diameter of the first plug for retaining the first plug in the bore.

16. A power surge protection assembly, comprising:
a bus bar coupled to ground, the bus bar having a bore;
a first suppression box having a top surface, a bottom surface, sides, and ends for encasing a first power protection circuit; and
a first plug assembly having a first plug attached to a first body, the first plug extending substantially outward from the bottom surface of the first suppression box, the first body being substantially enclosed within the first suppression box and coupling the first plug to the first power protection circuit inside the first suppression box, the first plug being received in the bus bar bore for electrically coupling the first power protection circuit to ground;
wherein the first plug assembly includes a first plug receiving member connected to the first plug, the first plug body, and to the first power protection circuit inside of the first suppression box, the first plug receiving member being accessible and substantially flush with the top surface of the first suppression box.

17. A power surge protection assembly, comprising:
a bus bar coupled to ground, the bus bar having a bore;
a first suppression box having a top surface, a bottom surface, sides, and ends for encasing a first power protection circuit;
a first plug assembly having a first plug attached to a first body, the first plug extending substantially outward from the bottom surface of the first suppression box, the first body being substantially enclosed within the first suppression box and coupling the first plug to the first power protection circuit inside the first suppression box, the first plug being received in the bus bar bore for electrically coupling the first power protection circuit to ground;
a second suppression box stacked on top of the first suppression box having a top surface, a bottom surface, sides, and ends for encasing a second power protection circuit; and
a second plug assembly having a second plug attached to a second plug body, the second plug extending substantially outward from the bottom surface of the second suppression box, the second body being substantially enclosed within the second suppression box and coupling the second plug to the second power protection circuit inside the second suppression box, the second plug being received in the first plug receiving member for electrically coupling the second power protection circuit to the first power protection circuit and to ground.

18. An assembly according to claim 17 wherein the second plug assembly includes a second plug receiving member connected to the second plug, the second plug body, and to the second power protection circuit inside of the second suppression box, the second plug receiving member being accessible and substantially flush with the top surface of the second suppression box.

19. A power surge protection assembly, comprising:

a bus bar for coupling to a power line;

a suppression box encasing a first power protection circuit; and a plug assembly coupled to the first power protection circuit and including a plug extending from the suppression box, the plug having inwardly springingly bendable sides that have a diameter greater than a diameter of a bore in the bus bar so that inserting the plug inside the bore bends the sides of the plug inward forming a compression fit used for holding the plug to the bus bar and also electrically coupling the suppression box to the power line.

20. A power surge protection assembly, comprising:

a bus bar for coupling to a power line;

a suppression box encasing a first power protection circuit; and a plug assembly coupled to the first power protection circuit and including a plug extending from the suppression box, the plug having inwardly springingly bendable sides that have a diameter greater than a diameter of a bore in the bus bar so that inserting the plug inside the bore bends the sides of the plug inward forming a compression fit used for holding the plug to the bus bar and also electrically coupling the suppression box to the power line;

wherein the plug assembly includes a cavity having a diameter less than a diameter of another plug extending from another suppression box, the cavity slidingly receiving and holding the other plug in a compression fit.

* * * * *

UNITED STATES PATENT AND TRADEMARK OFFICE
CERTIFICATE OF CORRECTION

PATENT NO.   : 5,966,282
DATED        : October 12, 1999
INVENTOR(S)  : Ryan et al.

Page 1 of 1

It is certified that error appears in the above-identified patent and that said Letters Patent is hereby corrected as shown below:

<u>Column 1,</u>
Line 64, "human healing" should read -- human hearing --;

<u>Column 10,</u>
Line 15, "snap ling" should read -- snap ring --;
Line 41, "Clip 152 if welded" should read -- Clip 152 is welded --.

Signed and Sealed this

Twenty-sixth Day of February, 2002

Attest:

JAMES E. ROGAN
*Attesting Officer*    *Director of the United States Patent and Trademark Office*